Jan. 25, 1927. 1,615,612
D. C. BREES
WIPER
Filed March 4, 1926
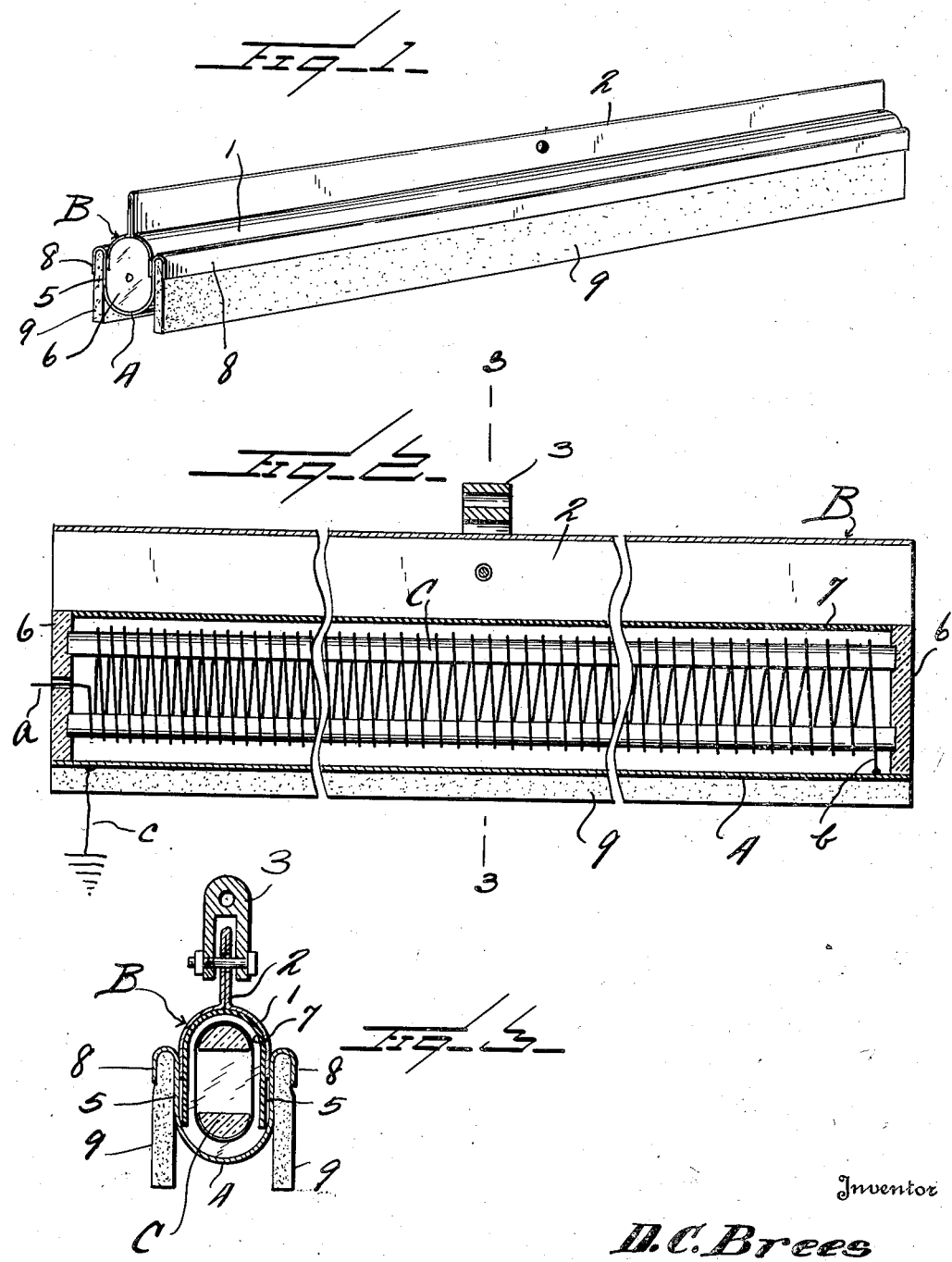

Patented Jan. 25, 1927.

1,615,612

UNITED STATES PATENT OFFICE.

DUDLEY C. BREES, OF BROUGHTON, KANSAS.

WIPER.

Application filed March 4, 1926. Serial No. 92,317.

This invention relates to a wiper and has relation more particularly to a device of this kind especially designed and adapted for use in connection with windshield wipers, and it is an object of the invention to provide a wiper of this kind which operates effectually to remove dust or the like and which is also provided with a heating medium to maintain the portion of the windshield with which the brush coacts free of frost, ice or snow.

Another object of the invention is to provide a device of this kind provided with spaced wiping elements together with a heating medium interposed between said elements.

The invention consists in the details of construction and in the combination and arrangement of the several parts of my improved wiper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective illustrating a wiper constructed in accordance with an embodiment of my invention;

Figure 2 is an enlarged sectional view taken lengthwise through the structure as illustrated in Figure 1 with an attaching member applied thereto;

Figure 3 is a sectional view taken substantially on the line 3—3 of Figure 2.

As disclosed in the accompanying drawing, my improved wiper comprises a back B having an upper section 1 substantially semi-circular in cross section and being so folded as to provide midway between its longitudinal edges an outstanding flange 2. This flange 2 extends entirely along the back B to give the same maximum of strength and to provide means whereby it may be operatively engaged with a desired type of wiper operating mechanism (not shown). As illustrated in Figures 2 and 3, the flange 2 at substantially its longitudinal center has engaged therewith a bracket 3 to facilitate its operative engagement with such mechanism.

Coacting with the section 1 is a lower section 4 substantially U-shaped in cross section, the free marginal portions of the side members 5 of said section 4 lapping the free marginal portions of the section 1 and soldered, welded or otherwise effectively connected thereto. The sections 1 and 4 are preferably formed of sheet metal and when assembled provide a housing or tubular back having its bore closed at each end by a plate 6 of suitable insulating material, such as porcelain or the like. The upper section 1 is provided with a lining 7 of asbestos or the like which extends entirely along said section between the end plates 6 and which also substantially overlies the side members 5 of the lower section 4.

Arranged within the housing afforded by the back B and supported by the end plates 6 is a heating coil C, one end of said coil being adapted for connection through the conductor $a$ with a suitable source of electrical energy while the opposite end of the coil is grounded through the conductor $b$ with the back B and more particularly the lower section 4. The back B also has leading therefrom a conductor $c$, preferably in connection with the upper section 1, leading to a suitable ground such as the frame of a windshield or otherwise as may be preferred.

The upper or connected marginal portions of the side members 5 of the lower section 4 are extended to provide the returned flanges 8 and between each of said flanges 8 and the adjacent side member or wall 5 of the section 4 is clamped a wiping element 9 preferably of felt, the outer or free longitudinal marginal portion of said element 9 extending beyond the back B and more particularly the section 4.

The wiping elements 9 provide two contacts with the portion of the windshield to be cleaned assuring such surface being effectively freed of dust or the like and in the event of a tendency of frost, snow or ice to hold to such surface of the windshield, the heating coil or element C is brought into action.

From the foregoing description it is thought to be obvious that a wiper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A wiper comprising a hollow casing, spaced parallel wiping elements carried by said casing and extending therebeyond, spaced plates of insulating material closing the ends of the casing, and a heating element within the casing and supported by said plates.

2. A wiper comprising, in combination, a tubular back, plates of insulating material closing the ends of the bore of said back, a heating coil within the back and supported by said end plates, and a wiping medium carried by the back.

3. A wiper comprising a casing, consisting of two channel sections each having side walls, the side walls of one section lapping the side walls of the second section when attached thereto, the marginal portions of the side walls of one of the sections being continued to provide returned flanges, and wiping strips engaged between said returned flanges and the adjacent walls of the sections.

4. A wiper comprising a back consisting of two sections each having side walls, the side walls of one section lapping the side walls of the second section when attached thereto, the attached marginal portions of the side walls of one of the sections being continued to provide returned flanges, wiping strips engaged between said returned flanges and the adjacent walls of the sections, and a heating medium within the tubular back provided by said assembled sections.

In testimony whereof I hereunto affix my signature.

DUDLEY C. BREES.